United States Patent [19]

Watanabe et al.

[11] Patent Number: 4,807,858
[45] Date of Patent: Feb. 28, 1989

[54] AIR SPRINGS

[75] Inventors: Isao Watanabe, Kodaira; Yasushi Fujihira, Tanashi, both of Japan

[73] Assignee: Bridgestone Corporation, Tokyo, Japan

[21] Appl. No.: 59,990

[22] Filed: Jun. 9, 1987

[30] Foreign Application Priority Data

Jun. 13, 1986 [JP] Japan .............................. 61-136287

[51] Int. Cl.⁴ .............................................. F16F 9/04
[52] U.S. Cl. .............................. 267/64.27; 267/64.19; 267/64.23; 267/35
[58] Field of Search ............... 267/64.19, 64.23, 64.24, 267/64.27, 64.16, 35, 122, 133, 257, 64.11; 92/98 D, 103 R, 103 F

[56] References Cited

U.S. PATENT DOCUMENTS

| 2,315,758 | 4/1943 | Willits | 92/103 R |
| 3,319,952 | 5/1967 | Travers | 267/64.27 |
| 3,438,309 | 4/1969 | Boileau | 92/103 R |
| 4,387,878 | 6/1983 | Zukausky | 92/98 D |

Primary Examiner—Andres Kashnikow
Assistant Examiner—Mark T. Le
Attorney, Agent, or Firm—Sughrue, Mion, Zinn, Macpeak & Seas

[57] ABSTRACT

An air spring comprises an air sleeve airtightly connected at both end portions to a piston and an end cap. The air sleeve has a substantially tapered form as a whole, wherein a portion forming a turned-up portion under a service stroke is a circumferentially continuous thin-gauge portion and a portion adjacent to at least one end of the thin-gauge portion is a circumferentially continuous thick-gauge portion.

4 Claims, 4 Drawing Sheets

FIG_1
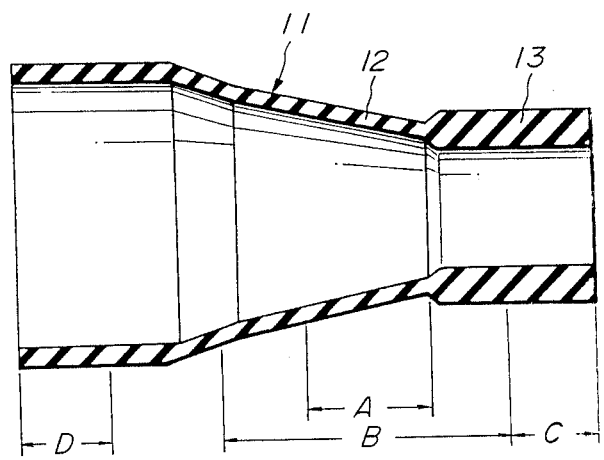

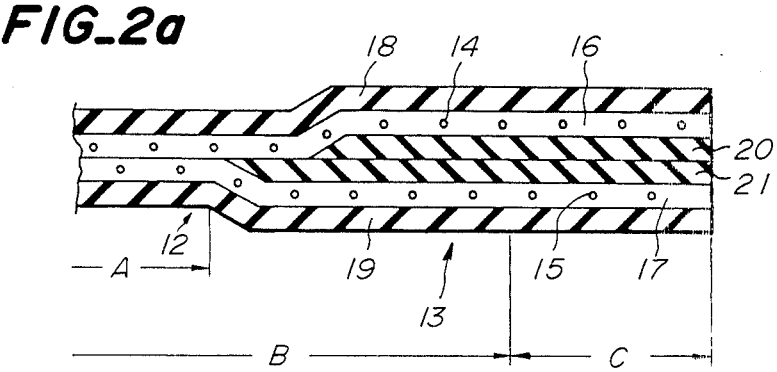
FIG_2a
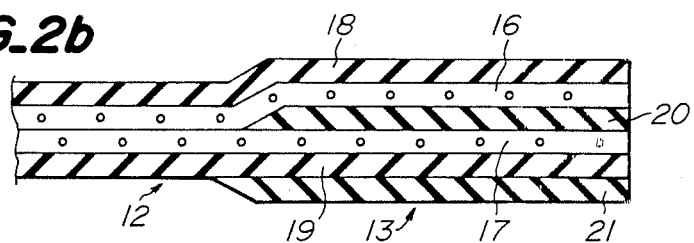
FIG_2b
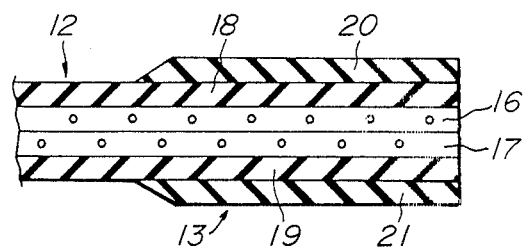
FIG_2c
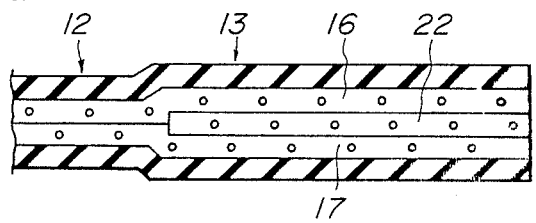
FIG_2d

FIG_3
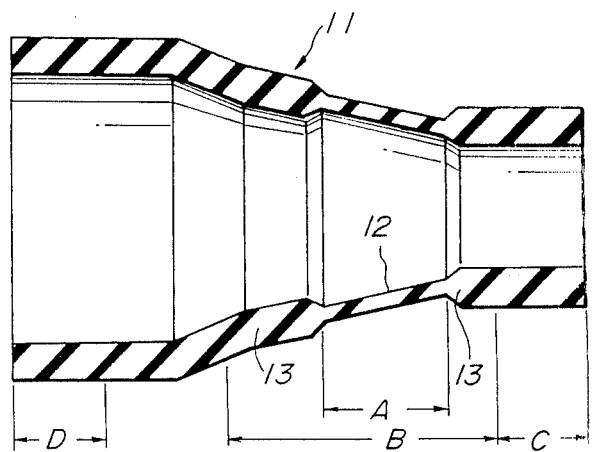
FIG_4a
PRIOR ART
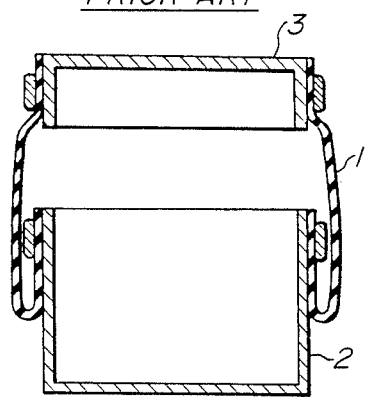
FIG_4b
PRIOR ART
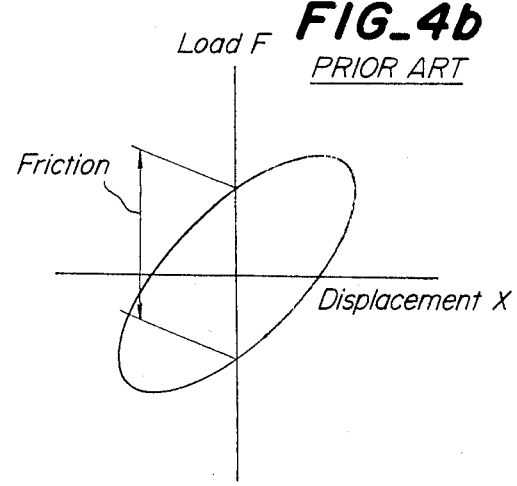

FIG_5
*PRIOR ART*
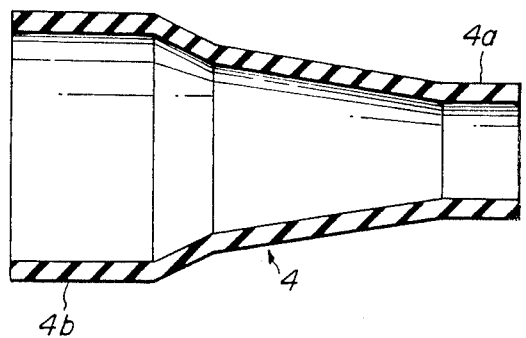
FIG_6
*PRIOR ART*
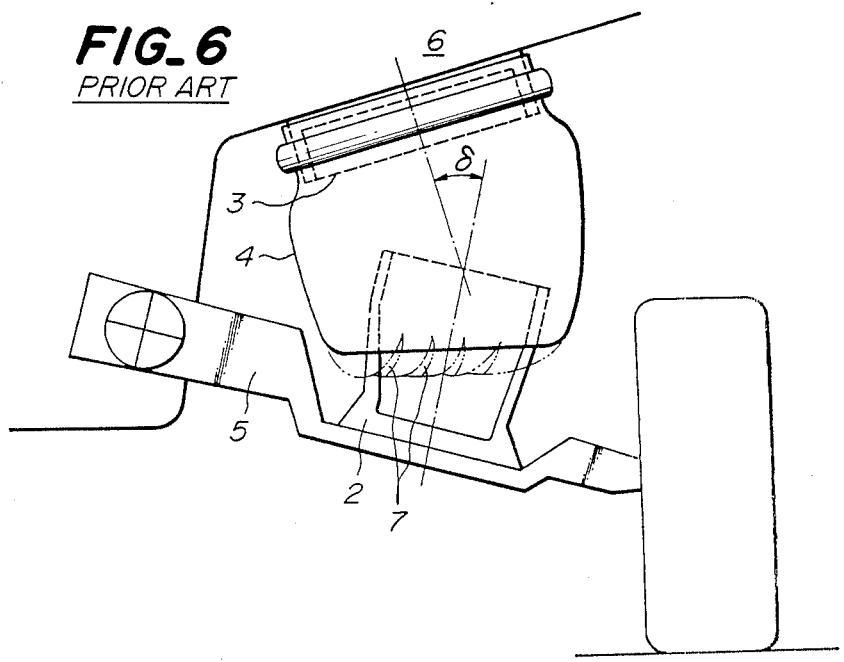

AIR SPRINGS

BACKGROUND OF THE INVENTION

1. Field of the Invention

This invention relates to air springs using a substantially tapered flexible air sleeve, and more particularly to an air spring capable of sufficiently reducing friction and effectively preventing the occurrence of wrinkles in a turned-up portion of the air sleeve when it is applied to a structure of changing a deflection angle between axis of piston and axis of end cap in expansion and contraction operation.

2. Related Art Statement

In a known diaphragm type air spring, there is a straight-type air sleeve 1 having uniform inner and outer diameters over its whole length is airtightly connected at its end portions to a piston 2 and an end cap 3, respectively, as shown in FIG. 4a.

In the air spring using such a straight-type air sleeve 1, however, the distance of elastic hysteresis loop in a direction of the minor axis becomes fairly long as shown in a load-displacement curve of FIG. 4b and hence the distance between intersections of hysteresis loop and load axis or a so-called friction is large. For instance, when the air spring is applied to an automotive vehicle, if vibrations having an amplitude of about ±10 mm are transmitted thereto, these vibrations cannot effectively be absorbed by the air spring, so that the ride comfortability of the vehicle is considerably damaged.

Recently, in order to sufficiently reduce the above friction and ensure the large stroke of piston 2 to end cap 3, there has been proposed an air spring with an air sleeve 4 having a substantially tapered form as sectionally shown in FIG. 5. It is airtightly connected at its small-diameter end portion 4a to the piston 2 and at its large-diameter end portion 4b to the end cap 3. And also, the gauge of the air sleeve 4 is uniformly thinned to about 2 mm for greater reduction of friction.

For instance, when each of the above air springs is mounted to an automotive vehicle at a posture shown in FIG. 4a, or when the air spring is used so as to align the axis of the piston 2 and the axis of the end cap 3 on a common line, the friction is reduced to improve the ride comfortability on the vehicle and also vibrations having a small amplitude as well as vibrations having a large amplitude are sufficiently effectively absorbed.

In these conventional air springs, particularly air spring using a thin an air sleeve, however, when it is applied so as to cross the axis of the piston 2 and the axis of the end cap 3 with each other at a deflection angle δ under a service load by fixing the piston 2 and the end cap 3 to an unsprung member 5 and a sprung member 6 in a vehicle wherein the unsprung member 5 and sprung member 6 gradually extend toward the side direction of the vehicle, for example, as shown in FIG. 6. There is still a problem that when the air spring is deformed in a direction of increasing the deflection angle or in the expansion direction under a load larger than the service load, plural wrinkles 7 are always produced in a turned-up portion of the air sleeve 4 as shown by a phantom line to lower the durability of the air sleeve 4.

SUMMARY OF THE INVENTION

It is, therefore, an object of the invention to advantageously solve the aforementioned problems of the conventional technics and to provide an air spring which can sufficiently reduce friction under a service stroke of the air spring and can not produce wrinkles in the air sleeve even at the increase of deflection angle between the axis of piston and the axis of end cap under a stroke larger than the service stroke.

According to the invention, there is the provision of an air spring comprising a substantially tapered air sleeve airtightly connected at its small-diameter end portion to a piston and at its large-diameter end portion to an end cap; said air sleeve having a circumferentially continuous thin-gauge portion at a position forming a turned-up portion when the air spring is subjected to a service stroke, and a circumferentially continuous thick-gauge portion at a position adjacent to at least one end of the thin-gauge portion.

That is, according to the invention, when the air spring is mounted to the automotive vehicle as shown in FIG. 6, the circumferentially continuous thick-gauge portion is formed adjacent to the thin-gauge portion over a required range at a position at least directed to the piston side if the deflection angle becomes larger is expansion under a stroke larger than the service stroke or the end cap side if the deflection angle increases in contraction under a stroke larger than service stroke.

In the air spring according to the invention, the air sleeve has a substantially tapered form as a whole and the thin-gauge portion is formed at a position forming the turned-up portion under the service stroke, so that the friction can sufficiently be reduced under the service stroke to improve the ride comfortability on the vehicle. Furthermore, the thick-gauge portion is formed adjacent to at least one end of the thin-gauge portion and acts as a turned-up portion of the air sleeve when the air spring is deformed so as to increase the deflection angle between axis of piston and axis of end cap under a stroke larger than the service stroke, so that the occurrence of wrinkles in the turned-up portion can surely be prevented by the increase of rigidity in the turned-up portion to enhance the durability of the air sleeve and hence the air spring.

BRIEF DESCRIPTION OF THE DRAWINGS

The invention will be described with reference to the accompanying drawings, wherein:

FIG. 1 is a longitudinal section view of an embodiment of the air sleeve used in the invention;

FIGS. 2a to 2d are partially enlarged sectional views of various embodiments in the thick-gauge portion of the air sleeve, respectively;

FIG. 3 is a longitudinal section view of another embodiment of the air sleeve used in the invention;

FIG. 4a is a section view of the conventional air spring;

FIG. 4b is a diagram showing a hysteresis loop of the air spring of FIG. 4a;

FIG. 5 is a longitudinal section view of the conventional tapered air sleeve; and FIG. 6 is a schematic view illustrating the application of the air spring to automotive vehicle.

DESCRIPTION OF THE PREFERRED EMBODIMENTS

In FIG. 1 is sectionally shown a first embodiment of the air sleeve used in the air spring according to the invention. This air sleeve 11 has a substantially tapered form as a whole and is flexible. It is airtightly connected at its small-diameter end portion to a piston and at its large-diameter end portion to an end cap, respectively, to thereby provide an air spring. When the resulting air spring is applied to an automotive vehicle as shown in FIG. 6, if it is deformed in the expansion, the deflection angle between axis of piston and axis of end cap gradually increases.

In the illustrated air sleeve 11, a portion shown by a range A is a turned-up portion under a service stroke of the air spring, and a portion shown by a range B is a turned-up portion under a stroke larger than the service stroke against large amplitude vibrations or a so-called full stroke, and ranges C and D are connecting portions to the piston and the end cap, respectively.

In the illustrated embodiment, the range A is a circumferentially continuous thin-gauge portion 12, and a portion located within the range B and adjacent to the thin-gauge portion 12 toward the connecting portion C is a circumferentially continuous thick-gauge portion 13. Moreover, in order to facilitate the connection of the air sleeve to the piston through, for example, caulking and sufficiently enhance the strength of the connecting portion C, the gauge of the connecting portion C is made substantially equal to that of the thick-gauge portion 13, which is not an essential feature of the invention.

The thick-gauge portion 13 may be constructed, for example, as shown in FIG. 2. That is, in the thick-gauge portion 13 of FIG. 2a, two cord reinforcing layers 16, 17 each containing plural cords (14, 15) therein, the cords of which layers being crossed with each other, are covered with an inner rubber layer 18 and an outer rubber layer 19, while two auxiliary rubber layers 20, 21 are interposed between the two cord reinforcing layers. Moreover, the end portion of each of the auxiliary rubber layers 20, 21 facing the range A is gradually thinned as shown in FIG. 2a, whereby air gap can be removed from the end portions of the auxiliary rubber layers 20, 21 between the cord reinforcing layers 16, 17 to effectively prevent the peeling between the auxiliary rubber layers 20, 21.

In this embodiment, the cords 14 and 15 are extended in opposite direction at an inclination angle of 38° with respect to the axis of the air sleeve 11.

Further, the thick-gauge portion 13 of FIG. 2b is constructed by arranging the auxiliary rubber layer 20 between the cord reinforcing layers 16, 17 and the other rubber layer 21 on the outer surface of the outer rubber layer 19, while the thick-gauge portion 13 of FIG. 2c is constructed by bonding the auxiliary rubber layers 20, 21 to the outer surfaces of the inner and outer rubber layers 18, 19 through vulcanization or the like, respectively.

Moreover, the thick-gauge portion 13 of FIG. 2d is constructed by interposing an additional cord reinforcing layer 22 between the two cord reinforcing layers 16 and 17.

In these embodiments, when the gauge of the thin-gauge portion 12 is 2.3 mm, the gauge of the thick-gauge portion 13 may be about 3.5 mm.

In FIG. 3 is sectionally shown a second embodiment of the air sleeve used in the air spring according to the invention, wherein only a portion of the air sleeve 11 corresponding to the range A is a thin-gauge portion 12 and the remaining portions other than the thin-gauge portion 12 are thick-gauge portions 13.

In the air sleeve 11 of FIG. 3, the occurrence of wrinkles under a stroke larger than the service stroke can surely and effectively be prevented by the thick-gauge portion 13 at the side of the connecting portion C when the deflection angle between axis of piston and axis of end cap increases in the deformation of the air spring toward the expansion, or by the thick-gauge portion 13 at the side of the connecting portion D when the deflection angle increases in the deformation toward the contraction.

According to the above embodiments, since the air sleeve 11 has a substantially tapered form as a whole and a portion corresponding to the range A is a circumferentially continuous thin-gauge portion 12, the friction under a service stroke of the air spring can be reduced sufficiently. Further, since a portion located within the range B and adjacent to at least one end of the thin-gauge portion 12 is a circumferentially continuous thick-gauge portion 13, the occurrence of wrinkles produced under a stroke larger than the service stroke can effectively be prevented by the rigidity of the thick-gauge portion 13. Therefore, when the deflection angle between axis of piston and axis of end cap increases in the deformation of the air spring toward the contraction, the thick-gauge portion 13 can be formed in a portion of the air sleeve 11 at only the side of the connecting portion D and adjacent to the thin-gauge portion 12 (not shown).

The invention will be described in detail with respect to results on friction and number and degree of wrinkles produced in a comparative test between the air spring according to the invention and the conventional air spring.

Air sleeves to be tested

Invention products: air sleeves shown in FIG. 1, wherein the gauges of thin-gauge and thick-gauge portions were 2.3 mm and 3.5 mm, respectively, and the cords of two cord reinforcing layers were crossed with each other at an inclination angle of 38° with respect to the axis of the air sleeve.

Product I: corresponding to FIG. 2a,

Product II: corresponding to FIG. 2b,

Product III: corresponding to FIG. 2b except that the auxiliary rubber layer 21 was adhered to the outer surface of the inner rubber layer 18, Product IV: corresponding to FIG. 2d, wherein the cords of the additional cord layer 22 were inclined at an angle of 38° with respect to the axis of the air sleeve, Product V: corresponding to FIG. 2d, wherein the cords of the additional cord layer 22 were inclined at an angle of 60° with respect to the axis of the air sleeve, Conventional Products:

Product I: air sleeve having a tapered form shown in FIG. 5 and a gauge of 2.3 mm, Product II: air sleeve having a tapered form shown in FIG. 5 and a gauge of 3.5 mm, Other: the same air sleeve as in the conventional product I, whose small-diameter portion having a diameter smaller by 10% than that of the piston.

Test conditions:

Friction: The friction (kg) was measured when the air spring was deformed in expansion and contraction directions, provided that the deflection angle between axis of piston and axis of end cap was zero.

Wrinkles: The number and degree of wrinkles produced were measured when the deflection angle was set to 32°.

The test results are shown in the following table.

|  | Invention products | | | | | Conventional product | | Other |
| --- | --- | --- | --- | --- | --- | --- | --- | --- |
|  | I | II | III | IV | V | I | II | — |
| Friction (kg) | 9 | 13 | 20 | 20 | 14 | 19 | 20 | 23 |
| Wrinkle |  |  |  |  |  |  |  |  |
| Number | 0 | 0 | 2 | 5 | 4 | 12 | 7 | 1 |
| Degree | ◎ | ◎ | ○ | Δ | ○ | × | Δ | ○ |

Note
◎ .. good
○ ... slightly good
Δ ... slightly bad
× ... bad

As seen from the above table, the invention products are generally small in the number and degree of wrinkles produced in comparison with the conventional products. Particularly, it is apparent that the improvement on friction and wrinkle in the invention products I and II is considerably excellent as compared with the case of the conventional products.

As mentioned above, according to the invention, the air sleeve has a substantially tapered form as a whole and a portion corresponding to the turned-up portion of the air sleeve under a service stroke is made into a circumferentially continuous thin-gauge portion, whereby the friction under the service stroke of the air spring can sufficiently be reduced. Furthermore, a portion adjacent to at least one end of the thin-gauge portion and forming a turned-up portion under a stroke larger than the service stroke is made into a circumferentially continuous thick-gauge portion, whereby the occurrence of wrinkles in the turned-up portion of the air sleeve can effectively be prevented when the air spring is deformed in a direction of increasing the deflection angle between axis of piston and axis of end cap.

What is claimed is:

1. An air spring comprising; a substantially tapered air sleeve airtightly connected at a small-diameter end portion to a piston, a large-diameter end portion connected to an end cap; said air sleeve having a circumferentially continuous thin-gauge portion at a position forming a turned-up portion when the air spring is subjected to a service stroke, and a circumferentially continuous thick-gauge portion at a position adjacent to at least one end of the thin-gauge portion and acting as a turn-up portion as the stroke of the air spring becomes larger than the service stroke.

2. The air spring according to claim 1, wherein said thick-gauge portion is formed adjacent to said thin-gauge portion at the side of the piston.

3. The air spring according to claim 1, wherein said thick-gauge portion is formed adjacent to said thin-gauge portion at the side of the end cap.

4. The air spring according to claim 1, wherein said thick-gauge portion is formed adjacent to both ends of said thin-gauge portion, respectively.

* * * * *